United States Patent
Spatz et al.

[15] 3,637,514

[45] Jan. 25, 1972

[54] VICINAL TOLUENEDIAMINE MIXTURES

[72] Inventors: Sydney M. Spatz, Williamsville; Maurice E. Bailey, Orchard Park; Francis E. Evans, Hamburg, all of N.Y.

[73] Assignee: Allied Chemical Corporation, New York, N.Y.

[22] Filed: June 20, 1969

[21] Appl. No.: 835,257

[52] U.S. Cl...........................252/182, 252/390, 252/401, 260/47 EN, 260/578, 260/582
[51] Int. Cl.................................................C07c 87/48
[58] Field of Search..................252/182, 390, 401; 260/578, 260/582, 47 EP, 348

[56] References Cited

UNITED STATES PATENTS

| | | | |
|---|---|---|---|
| 2,853,467 | 9/1958 | Bloom et al. | 260/47 |
| 3,246,035 | 4/1966 | Forman et al. | 260/578 |
| 3,413,350 | 11/1968 | Cross et al. | 260/578 |
| 3,414,619 | 12/1968 | Cross et al. | 260/578 |
| 3,420,752 | 1/1969 | Kirss et al. | 260/582 |

*Primary Examiner*—Richard D. Lovering
*Assistant Examiner*—Irwin Gluck
*Attorney*—Ernest A. Polin

[57] ABSTRACT

Toluenediamine mixtures comprising at least about 96 percent by weight of vicinal toluenediamine isomers and not more than about 4 percent by weight of nonvicinal isomers, said mixtures being adapted for conversion to bz-methyl-1-H-benzotriazoles in high yields.

3 Claims, No Drawings

VICINAL TOLUENEDIAMINE MIXTURES

VICINAL TOLUENEDIAMINE MIXTURES

The present invention relates to vicinal aromatic diamine mixtures. More particularly it relates to mixtures of vicinal toluenediamines which are suitable for conversion to bz-methyl-1-H-benzotriazoles in high yields.

Vicinal toluenediamines, sometimes called ortho-toluenediamines, and more specifically 1-methyl-2,3- and 1-methyl-3,4-phenylene diamines, are precursors of bz-methyl-1-H-benzotriazoles, i.e., 4- and 5-methyl-1-H-benzotriazoles, which are valuable tarnish and corrosion inhibitors. In the past, conversions of individual vicinal toluenediamines to the corresponding methyl benzotriazoles in the conventional manner, as by low temperature diazotizations at between about 0° C. and 5° C. followed by ring closure at elevated temperatures of above about 50° C., have afforded yields of the triazole of no more than about 68 percent of theory, even when individual vicinal isomers of purities over 99 percent are used. Moreover, such individual isomers, even when they contain only a small fraction of a percent of nonvicinal isomers produce considerably tarry byproduct, for example as high as about 30 percent or more based on the weight of the triazole product.

A prior art expedient for improving product yield in the foregoing conventional syntheses, which prescribes both diazotization and cyclization at elevated temperature, requires impractically slow mixing of the reactants and generally entails addition of antioxidant to protect the labile vicinal diamine.

Vicinal toluenediamine mixtures are byproducts of the manufacture of nonvicinal toluenediamines by reduction of dinitrated toluene, as described in U.S. Pat. No. 3,420,752, granted Jan. 7, 1969, and are separable therefrom by fractional distillation. However, such prior art vicinal diamine mixtures contain no more than about 90 percent ortho isomers, usually between about 70 percent and about 90 percent ortho isomers, the remainder predominantly nonvicinal toluenediamines. We have found that these mixtures, when subjected to the above conventional techniques, produce unacceptably low conversions to methyl benzotriazoles. The reason for such low conversions is not clearly understood since even vicinal toluenediamine distillates of reduced dinitrotoluene which contain as much as about 90 weight percent vicinal toluenediamines, and even similar mixtures containing as much as about 95 weight percent vicinal isomers, give a product yield in the neighborhood of only about 60 percent of theory and give rise to extensive formation of byproduct which appears as a tar. Moreover, methyl benzotriazoles, as conventionally prepared from such diamine mixtures, contain a colored contaminant which cannot be removed by recrystallization. Such discoloration precludes use of the product in many application, e.g., in household detergents.

It is an object of the present invention to provide a mixture of vicinal toluenediamines suitable for conversion to bz-methyl-1-H-benzotriazoles in high yields of at least about 70 percent of theory and free of objectionable colored contaminants.

This and other objects and advantages are accomplished according to our invention by providing a mixture of 2,3-toluenediamine and 3,4-toluenediamine containing total vicinal toluenediamines of at least about 96 percent by weight and not more than about 4 percent by weight of nonvicinal toluenediamines, said mixtures containing 2,3-toluenediamine in amounts sufficient to provide a ratio of 2,3- to 3,4-toluenediamine between about 0.3:1 and about 1.5:1.

We have found, surprisingly, that when mixtures of vicinal toluenediamines of the purity and compositions described above are subjected to conventional diazotization and cyclization, the diamines of the invention afford mixtures of 4- and 5-methyl-1-H-benzotriazoles in yields which are about 10–30 percent greater than those produced in comparable reactions of mixtures of lesser proportions of vicinal toluenediamines and are at least equivalent to yields obtained with individual vicinal toluenediamines of over 99 percent purity. Yields from mixtures of the vicinal toluenediamines of the invention, moreover, are 10-20 percent greater than those produced in comparable reactions of individual toluenediamines of similar vicinal toluenediamine content. The amount of high molecular weight side product obtained on conversion of the present novel vicinal diamine mixtures to benzotriazoles is unexpectedly small, decreasing as the proportion of nonvicinal toluenediamines decreases. It is thus apparent that the mixtures of 2,3- and 3,4-toluenediamines in the proportions prescribed by the invention promote methyl benzotriazole formation whereas contamination of the diamine mixtures with higher proportions of nonvicinal toluenendiamines inhibits benzotriazole formation.

The vicinal toluenediamine mixtures of the invention can be prepared by any suitable procedure. They can be prepared, for example, by blending molten 2,3- and 3,4-toluenediamines in the proportions prescribed by the invention. More economically, the novel mixtures are obtained from the reduced aromatic dinitration product of toluene, for example by fractional distillation of the resulting toluenediamine mixtures at reflux ratios greater than about 50:1. An especially efficient production of the novel diamine mixtures is achieved by fractional distillation of the aforementioned vicinal toluenediamine distillates obtained as described in U.S. Pat. No. 3,420,752, employing a distillation column of about 15 to 30 or more theoretical plates, a still head temperature and pressure of about 150°–180° C. and 20–60 mm. Hg, respectively, and a reflux ratio of about 3:1 to 10:1 or greater.

Conversion of the vicinal toluenediamines to the corresponding methyl benzotriazoles proceeds as illustrated below:

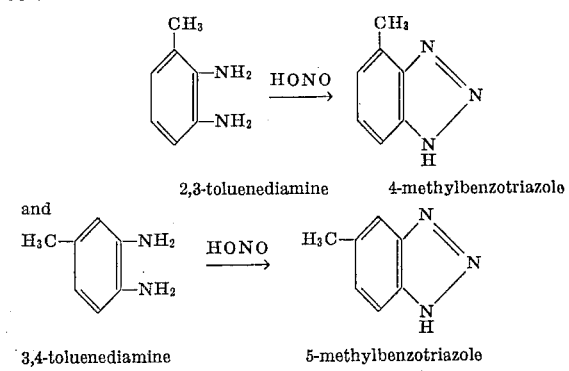

2,3-toluenediamine → 4-methylbenzotriazole and 3,4-toluenediamine → 5-methylbenzotriazole Vicinal toluenediamine mixtures of the invention suitable for conversion to methyl benzotriazoles in yields of about 70 percent of theory or higher should contain at least about 96 percent by weight of vicinal toluenediamines and should contain 2,3- and 3,4-toluenediamines in weight ratios between about 0.3:1 and 1.5:1, more preferably between about 0.6:1 and 1.2:1 and especially between about 0.65:1 to 0.85:1. The amount of nonvicinal toluenediamine in such mixtures should be no more than about 4 percent by weight. Vicinal toluenediamine mixtures of the invention containing about 96 percent by weight of vicinal toluenediamines provide yields of methylbenzotriazoles at least as high as those of highly pure, i.e., over 99 percent pure, individual vicinal toluenediamines, and no greater tar formation than obtained with such highly pure individual vicinal toluenediamines. Such mixtures also yield products having an off-white color, acceptable for most purposes such as epoxy resin curing. Mixtures containing about 98 percent by weight of vicinal toluenediamines provide yields of about 80 percent of theory and substantially less tar than the highly pure individual isomers and thus give an additional advantage. Mixtures containing at least about 99.5 percent by weight of vicinal toluenediamines and not more than about 0.5 percent by weight of nonvicinal toluenediamines are especially preferred since they provide methylbenzotriazoles in yields of about 90 percent or more having extremely low tar contents. Such methylbenzotriazoles are substantially colorless after recrystallization and, hence, are eminently suitable for use in household detergents.

The vicinal toluenediamine mixtures of the invention are effective in hardening (i.e., curing) liquid epoxy resin-forming compositions (such as the diglycicyl ether of bisphenol A) to resins having an excellent degree of cross-linking. Curing of epoxy resins employing the diamine compositions of the invention if effected in an essentially conventional manner, as disclosed in H. Lee and K. Neville "Handbook of Epoxy Resins," McGraw-Hill Book Co., New York, N.Y. 1967, Chapter 8.

In the following examples which illustrate our invention, parts, percentages and proportions are by weight, unless otherwise noted, and temperatures are in degrees centigrade.

EXAMPLE 1

Production of Pure Vicinal Toluenediamines From a Mixture High in Ortho Isomers

A still equipped with a 40-plate Oldershaw column (1-inch diameter; 21 to 22 theoretical plates) is charged with about 3,991 parts of a vicinal and nonvicinal toluenediamine mixture (distilled from the reduced aromatic dinitration product of toluene in accordance with U.S. Pat. No. 3,420,752) having the following composition:

72.4 percent 2,3- and 3,4-toluenediamines
0.63 percent 2,5-toluenediamine
25.85 percent 2,4- and 2,6-toluenediamines
1.03 percent "lites" (i.e., compounds more volatile than the foregoing toluenediamine isomers)

This mixture is distilled at a reflux ratio of about 10:1 to remove a distillation forecut (237 parts) containing the "lites" (collected at a still head temperature and pressure of 116°–172° and 48–50 mm. Hg, respectively, and a still bottom temperature and pressure of 135°–195° and 84–87 mm. Hg, respectively. The reflux ratio is adjusted to about 5:1 and 1,838 parts of distillate is collected at a still head temperature and pressure of 172°–173° and 49–50 mm. Hg, respectively and a still bottom temperature and pressure of 195°–202° and 86–90 mm. Hg, respectively. The distilled product which is a solid (m.p. of about 56°–64°) contains about 99.97 percent vicinal toluenediamines, i.e., 2,3-toluenediamine and 3,4-toluenediamine, the isomers being present in proportions of 2,3- to 3,4-isomers in the range of about 0.3:1 and 1.5:1 and containing no more than 0.03 percent nonvicinal toluenediamines, i.e., 2,4-; 2,5-; 2,6-toluenediamines.

EXAMPLE 2

Production of Pure Vicinal Toluenediamines From a Mixture Low in Ortho Isomers

A mixture containing isomeric toluenediamines, 1.11 percent 2,3-; 2.06 percent 3,4-; 0.31 percent 2,5-; 21.8 percent 2,6- and 74.7 percent 2,4-isomers, corresponding to about 3.2 percent vicinal toluenediamines and 96.8 percent nonvicinal toluenediamines, obtained by reduction of the aromatic dinitration product of toluene is continuously distilled to recover a nonvicinal toluenediamine distilland following the procedure of U.S. Pat. No. 3,420,752, but employing a reflux ratio in the range of about 50:1 to about 60:1, i.e., a reflux ratio greater than that prescribed in the aforementioned patent. A sample (about 450 parts distillate) collected at a still head temperature and pressure of about 158° and 24 mm. Hg, respectively; a still bottom (i.e., reboiler) temperature and pressure of 214° and 80 mm. Hg, respectively, a still feed rate of $2.04 \times 10^6$ parts per hour and a distillate recovery rate of $4.77 \times 10^4$ parts per hour) has the following composition:

40.4 percent 2,3-toluenediamine
59.2 percent 3,4-toluenediamine
0.4 percent 2,4-toluenediamine
a trace 2,6-toluenediamine
(i.e., 99.6 percent vicinal toluenediamines, in the proportion of 0.68 of 2,3-isomer to 1.0 of 3,4-isomer, and about 0.4 percent nonvicinal toluenediamines.)

EXAMPLE 3

Production of a Mixture of 4- and 5-methyl-1-H-benzotriazoles (MBT) From a Mixture of 2,3- and 3,4-toluenediamines A slurry of 244 parts (containing 243 parts, 1.99 mols vicinal toluenediamines) of the toluenediamine distillate of example 2 (containing 99.6 percent vicinal toluenediamines) in a mixture of 240 parts glacial acetic acid and 600 parts of water is agitated at 40°–50° to dissolve the diamine mixture. The resultant solution is cooled to about 5° and charged rapidly to a solution of 154 parts (2.18 mols) sodium nitrite in 240 parts water. The temperature of the diazotized mass is allowed to rise to 90°. The reaction mixture is then agitated for about 1 hour while being allowed to cool to 40°. The cooled mass is allowed to stand at ambient temperature (ca 25°) for about 16 hours. The aqueous acetic acid layer which separates on standing is decanted and extracted with 37.2 parts chloroform. The chloroform extract is washed by extraction with three 500 part portions of water and then distilled at atmospheric pressure to recover chloroform. The resultant distilland is distilled at a still head temperature of 182°–187°; a still bottom temperature of 207°–231° and still head pressure of 3 mm. Hg, to recover 243 parts of crude product as distillate and 5 parts of distillation residue (a reddish brown tarry reaction byproduct corresponding to only 2.04 percent of the distilled crude product). The reddish yellow crude is recrystallized from 580.8 parts of benzene, dried in vacuo at ambient temperature for about 16 hours and finally dried at 45°–50° in vacuo. The resultant product (242 parts, 91.5 percent of theory based on vicinal toluenediamine) charged is a white solid mixture of 4- and 5-methyl-1-H-benzotriazoles (m.p. 73°–78).

EXAMPLE 4

The procedure of example 3 is repeated substantially as described employing the vicinal toluenediamine distillate of example 1 (containing 99.9 percent vicinal toluenediamines). On distillation of the chloroform-extracted organic layer of the reaction mixture, 240 parts of distilled crude product are recovered together with 8 parts nonvolatile residue (corresponding to only 3.33 percent of the distilled crude product). On recrystallization of the crude from 652 parts of benzene, 239 parts (90 percent yield of theory) of a mixture of 4- and 5-methyl-1-H-benzotriazoles (a white solid, m.p. 74°–75) is obtained.

EXAMPLE 5

When a mixture containing 98.0 percent vicinal and 2.0 percent nonvicinal toluenediamines is treated as described in example 3 above, an 80 percent yield of theory, based on vicinal toluenediamine charged, of an off-white mixture of 4- and 5-methyl-1-H-benzotriazoles (m.p. 71°–73°) is obtained.

EXAMPLE 6

When a mixture containing 96.6 percent vicinal and 3.4 percent nonvicinal toluenediamines is treated as described in example 3 above, a 70 percent yield of theory based on vicinal toluenediamine charged of an off-white solid mixture of 4- and 5-methyl-1-H-benzotriazoles (m.p. 72°–74°) is obtained.

EXAMPLE 7

The following comparative example illustrates the unsatisfactory production of bz-methyl-1-H-benzotriazoles from a vicinal toluenediamine mixture containing about 4.7 percent nonvicinal toluenediamines which is obtained from the reduction product of the aromatic dinitration of toluene.

A vicinal toluenediamine mixture of the following composition 39.6 percent 2,3-toluenediamine
55.6 percent 3,4-toluenediamine
1.3 percent 2,6-toluenediamine
3.4 percent 2,4-toluenediamine (i.e., 95.2 percent vicinal and 4.7 percent nonvicinal toluenediamine)
is treated substantially as described in example 3 above. The results of this experiment are compared with those of examples 3 and 4 in the table below.

EXAMPLE 8

The following comparative example illustrates the relatively low yield of 5-methyl-1-H-benzotriazole produced from substantially pure 3,4-toluenediamine.

The procedure of example 3 is repeated substantially as described in treating 36.6 parts (0.3 mol) of 3,4-toluenediamine containing at least 99.5 percent of 3,4-toluenediamine, as analyzed by nuclear magnetic resonance spectra, dissolved in 72.3 parts glacial acetic acid and 90 parts water, with a solution of about 4 parts (0.57 mole) sodium nitrite in 65 parts water. The results of this experiment are compared with those of examples 3 and 4 in the table below.

about 60° and blended with 26.1 parts (0.138 equivalents) of a liquid diglycidyl ether of Bisphenol A (Epon 828) and allowed to stand in water bath maintained at 60°±1°. The mass solidifies to an excellent epoxy resin in about 96 to 156 minutes, the maximum temperature of the mixture at gelation being about 84°.

PART B—Four bars (½ inch × ½ inch × 4 inches) of cured epoxy resin are prepared by blending Bisphenol A diglycidyl ether with vicinal toluenediamine mixture as described in part A and heating the liquid mixture in suitable molds for 3 hours at 90° and, subsequently, for 4 hours at 150°.

The mean heat deflection temperature of the samples is 163° (as determined at 264 p.s.i. fiberstress according to the procedure of ASTM D648–56, "1965 Book of ASTM Standards," American Society for Testing and Materials, Philadelphia, Pa., Part 27, pp. 208–211) indicating an excellent degree of cross-linking in the cured resin.

We claim:

1. Toluenediamine mixtures comprising at least about 96 percent by weight of vicinal toluenediamines consisting of 2,3-toluenediamine and 3,4-toluenediamine, in a weight ratio of 2,3- to 3,4-toluenediamine between about 0.3:1 and about 1.5:1 and containing not more than about 4 percent by weight of nonvicinal toluenediamines.

2. The toluenediamine mixture of claim 1 wherein the

TABLE

| Ex. | Toluenediamine charged | Distilled crude product | Distillation residue (reaction by-product) | Yield of recrystallized product (MBT) based on vicinal diamine charged |
|---|---|---|---|---|
| 3 | 99.6% vicinal, 0.4% non-vicinal toluenediamines obtained in Ex. 2 (244 parts containing 243 parts, 1.99 mols, of the vicinal isomers). | 243 parts of reddish yellow solid. | 5 parts of reddish brown tar (2.02% of distilled crude product). | 91.5% of white solid, M.P. 73–78° C. |
| 4 | 99.9% vicinal, 0.1% non-vicinal toluenediamines obtained in Example 1 (244 parts, 2 mols vicinal toluenediamines). | 240 parts of reddish yellow solid. | 8 parts of reddish brown tar (3.33% of distilled crude product). | 90% of white solid, M.P. 74–67° C. |
| 5 | 98.0% vicinal, 2.0% non-vicinal toluenediamines. | 176.2 parts of reddish yellow solid. | 25.7 grams reddish brown tar (14.6% of distilled crude product). | 80% of off white solid, M.P. 71–73° C. |
| 6 | 96.6% vicinal, 3.4% non-vicinal toluenediamines. | 159.4 parts of reddish yellow solid. | 46.8 grams reddish brown tar (29.3% of distilled crude product). | 70% of off-white solid, M.P. 72–74° C. |
| 7 | 95.2% vicinal, 4.7% non-vicinal toluenediamines distilled from the reduced product of the dinitration of toluene (256.3 parts containing 244 parts, 2 mols of the vicinal diamines. | 172 parts of reddish yellow solid. | 83 parts of reddish brown tar (48.3% of distilled crude product). | 61.3% of brown solid, M.P. 69–70° C. |
| 8* | 3,4-toluenediamine (36.6 parts, containing at least 99.5%, 0.298 mol, of the 3,4 isomer. | 27 parts of yellow solid. | 8 parts of reddish borwn tar (29.6% of distilled crude product). | 68% of white solid, M.P. 77–78° C. |

*Comparable results are obtained with 2,3-toluenediamine containing at least 99.5% 2,3-toluenediamine as with 3,4-toluenediamine.

EXAMPLE 9

Epoxy Resin Curing with Vicinal Toluenediamines

PART A—A vicinal toluenediamine mixture (3.9 parts, 0.0638 equivalents) which is obtained according to the procedure of example 1 above and contains about 99.88 percent vicinal toluenediamines; 0.046 percent nonvicinal toluenediamines and about 0.073 percent "lites" is melted at vicinal toluenediamines comprise at least about 98 percent by weight of the mixture and nonvicinal toluenediamines comprise no more than about 2 percent by weight of the mixture.

3. The toluenediamine mixture of claim 1 wherein the vicinal toluenediamines comprise at least about 99.5 percent by weight of the mixture and nonvicinal toluenediamines comprise no more than about 0.5 percent by weight of the mixture.

* * * * *